(12) United States Patent
Kim et al.

(10) Patent No.: US 11,560,158 B2
(45) Date of Patent: Jan. 24, 2023

(54) ROBOT AND METHOD FOR CONTROLLING THE SAME

(71) Applicant: LG ELECTRONICS INC., Seoul (KR)

(72) Inventors: Boyeon Kim, Seoul (KR); Bina Kim, Seoul (KR); Jinsu Kim, Seoul (KR); Mina Suh, Seoul (KR); Jungkyu Son, Seoul (KR); Hyesun Lee, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 313 days.

(21) Appl. No.: 16/899,101

(22) Filed: Jun. 11, 2020

(65) Prior Publication Data
US 2021/0070323 A1    Mar. 11, 2021

(30) Foreign Application Priority Data
Sep. 6, 2019    (KR) .......................... 10-2019-0111036

(51) Int. Cl.
| | | |
|---|---|---|
| *B60W 60/00* | (2020.01) | |
| *B60W 50/08* | (2020.01) | |
| *G06F 21/31* | (2013.01) | |
| *G01C 21/26* | (2006.01) | |
| *G01C 21/36* | (2006.01) | |

(52) U.S. Cl.
CPC .... *B60W 60/00253* (2020.02); *B60W 50/082* (2013.01); *G01C 21/265* (2013.01); *G01C 21/3617* (2013.01); *G06F 21/31* (2013.01)

(58) Field of Classification Search
CPC .......... B60W 60/00253; B60W 50/082; G01C 21/265; G01C 21/3617; G06F 21/31; G06F 2221/2149; B25J 11/008; B25J 9/161; B25J 9/1651; B25J 9/1664; B25J 9/1679
See application file for complete search history.

(56) References Cited

U.S. PATENT DOCUMENTS

| | | | | |
|---|---|---|---|---|
| 2007/0255491 | A1* | 11/2007 | Geelen ................. | G09B 29/102 |
| | | | | 701/465 |
| 2013/0226731 | A1* | 8/2013 | MacNeille ......... | G01C 21/3476 |
| | | | | 705/26.8 |
| 2017/0326019 | A1* | 11/2017 | Bramsiepe .............. | B62B 5/064 |
| 2018/0081360 | A1* | 3/2018 | Bostick .................. | G06Q 50/30 |
| 2019/0121363 | A1* | 4/2019 | Roth .................. | G01C 21/3492 |
| 2020/0247426 | A1* | 8/2020 | Rafferty .............. | B60W 50/082 |
| 2021/0389760 | A1* | 12/2021 | Liotti .................... | B60W 10/04 |
| 2022/0055222 | A1* | 2/2022 | Higashi ................ | G06V 40/174 |

* cited by examiner

*Primary Examiner* — Jess Whittington
*Assistant Examiner* — Brian E Yang
(74) *Attorney, Agent, or Firm* — Birch, Stewart, Kolasch & Birch, LLP

(57) ABSTRACT

A robot according to an embodiment of the present disclosure includes an authentication interface for authenticating a user's boarding of the robot using authentication information of the user, a position detector for detecting a position of the robot in a space, a processor for identifying a first section corresponding to the detected position among at least one section in the space, recognizing at least one driving mode for the first section among a plurality of driving modes with different driving speeds, setting one of the recognized at least one driving mode as a driving mode for the first section based on the authentication information, and controlling driving of the robot based on the set driving mode, and a display for outputting information on the set driving mode.

18 Claims, 11 Drawing Sheets

ROBOT AND METHOD FOR CONTROLLING THE SAME

CROSS-REFERENCE TO RELATED APPLICATIONS

This application claims the priority benefit under 35 U.S.C. § 119(a) of Korean Patent Application No. 10-2019-0111036, filed in the Republic of Korea on Sep. 6, 2019, the entire contents of which are hereby incorporated by reference herein.

BACKGROUND OF THE INVENTION

1. Field of the Invention

The present disclosure relates to a robot and a method for controlling the same, and more particularly, to a robot for controlling a speed of an autonomous driving robot according to a position and a method for controlling the same.

2. Discussion of the Related Art

In recent years, the functions of robots have expanded with the development of deep learning technology, autonomous driving technology, automatic control technology, and internet of things.

To explain the technologies in detail, the deep learning corresponds to a field of machine learning. The deep learning is a technology that allows a program to make similar decisions in various situations, rather than a technology of setting commands in a program according to conditions in advance. Thus, the deep learning allows computers to think similarly to human brain and perform the analysis of vast amounts of data.

The autonomous driving is a technology that allows a machine to move based on its own determination and avoid obstacles. According to the autonomous driving technology, the robot autonomously recognizes a position through a sensor to move and avoid obstacles.

The automatic control technology is a technology that automatically controls the operation of the machine by feeding back the measured value obtained by inspecting machine states in the machine to a control device. Therefore, control without human operation is possible, and automatic adjustment may be performed such that a target control object falls within a target range, that is, reaches a target value.

The Internet of Things is an intelligent technology and service that connects all things based on the Internet to enable communication of information between people and things or things and things. Devices connected to the Internet by the Internet of Things are able to communicate with each other autonomously by transmitting and receiving information between themselves without any help by human.

In this regard, there is a conventional driving robot, which has a problem in that it is difficult to select a speed or move as desired because the driving robot must be directly manipulated by a user or drawn by a companion or employee.

In addition, since only a simple speed adjustment can be performed and a situation-specific speed must be set by a user herself or himself, a person who is not a frequent wheelchair driver has a problem in that he or she cannot recognize a sensible speed for each speed.

SUMMARY OF THE INVENTION

An object of the present disclosure is to provide a robot that moves at different speeds according to an area in a specific space.

Another object of the present disclosure is to provide a method of controlling a robot, which calculates a user's schedule or a time remaining until a destination is reached and proposes a driving mode to the user.

A robot according to an embodiment of the present disclosure includes an authentication interface configured to authenticate a user's boarding through authentication information of the user, a position detector configured to detect a position of the robot in a space, a processor (e.g., central processing unit (CPU)) configured to identify a first section corresponding to the detected position among at least one section (e.g., area) in the space, recognize at least one driving mode configurable for the identified section among a plurality of driving modes with difference driving speeds, set one of the recognized at least one driving mode as a driving mode for the first section based on the authentication information, and control driving of the robot based on the set driving mode, and a display configured to output information on the set driving mode.

According to an embodiment, the processor may recognize that the robot is located in a second section, which is a next section of the first section based on the position detected by the position detector during driving of the robot, and maintain or change the set driving mode based on the second section and the authentication information.

According to an embodiment, the processor may set the one driving mode among the at least one driving mode as the driving mode for the first section based on a destination arrival-requested time, the detected position and a destination, and wherein information on the destination arrival-requested time is included in the authentication information or is received from a server connected to the robot.

According to an embodiment, the processor may display information on a remaining time until the destination arrival-requested time through the display.

According to an embodiment, the plurality of driving modes may include at least one of a walking mode, a shopping mode, a boarding mode, and a general mode.

According to an embodiment, the processor may set the driving mode to the boarding mode when the remaining time until the destination arrival-requested time is less than a preset time, and a driving speed of the boarding mode is faster than a driving speed of the general mode.

According to an embodiment, the processor may set the driving mode to the walking mode when information on a companion of the user is received or when authentication information of the companion is obtained through the authentication interface, and a driving speed of the walking mode is slower than a driving speed of the general mode.

According to an embodiment, the space includes an airport (or may include any other space, such as a mall, including indoor and outdoor malls, or any other indoor or outdoor space), the processor may detect, using the position sensor, that the robot and the user enters an air-side of the airport (i.e., the side of an airport terminal beyond passport and customs control), the processor may set the driving mode to the shopping mode when the remaining time until the destination arrival-requested time is greater than or equal to a preset time, and the processor may set a driving speed of the shopping mode of the robot to be slower than a driving speed of a general mode of the robot.

According to an embodiment, the processor may control driving of the robot so as to follow a preset shopping path or when the shopping mode is set, a shopping path set by the user.

According to an embodiment, the processor may switch the driving mode to the boarding mode when the remaining time until the destination arrival-requested time is less than the preset time.

According to an embodiment, the processor may output information on at least one activity executable in the first section through the display when a remaining time until the destination arrival-requested time is greater than or equal to a preset time.

A method of controlling a robot, according to an embodiment includes authenticating a user's boarding through authentication information of the user, detecting a position of the robot in a space (including a space where the robot is located and intends to travel), identifying a first section corresponding to the detected position among at least one section in the space, setting one of a plurality of driving modes with difference driving speeds as a driving mode for the first section based on the identified first section and the authentication information; and controlling driving of the robot based on the set driving mode.

DETAILED DESCRIPTION OF THE PREFERRED EMBODIMENTS

Figure 1:
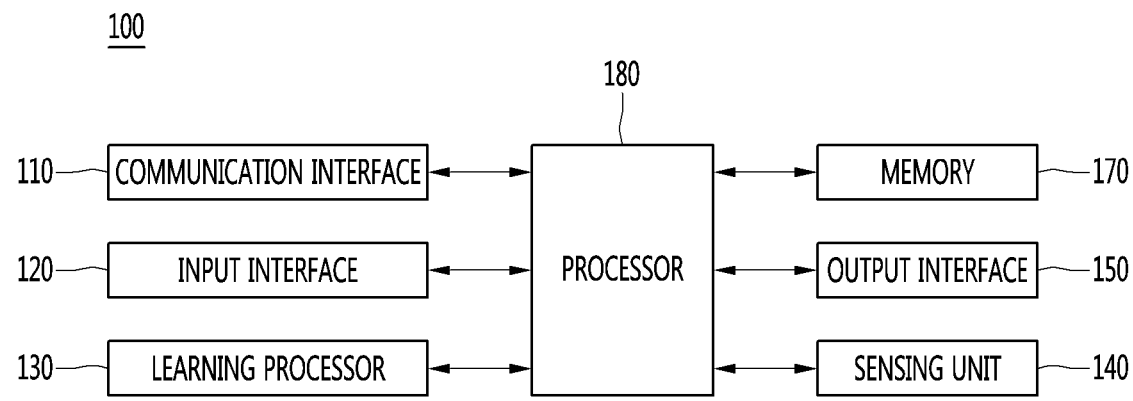
FIG. 1 illustrates an AI device including a robot according to an embodiment of the present disclosure.

Hereinafter, embodiments disclosed herein will be described in detail with reference to the accompanying drawings. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability, which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function FIG. 1 illustrates an AI device including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensing unit 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
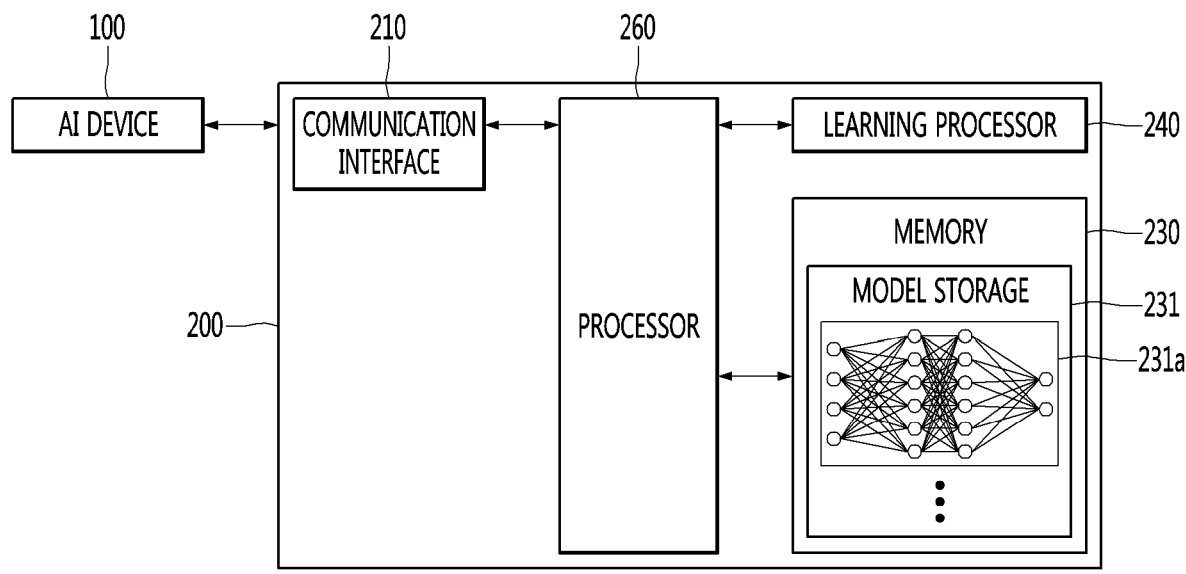
FIG. 2 illustrates an AI server connected to a robot according to an embodiment of the present disclosure.

FIG. 2 illustrates an AI server connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model, such as an artificial neural network 231a, through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
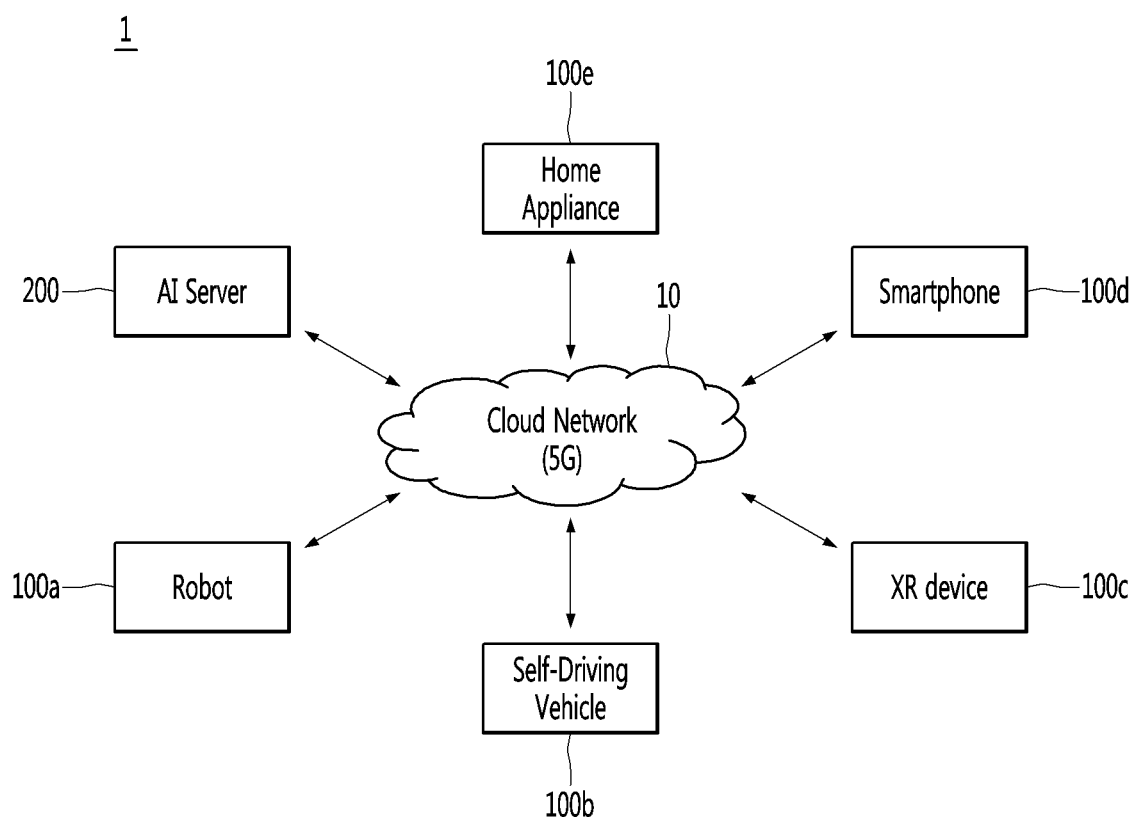
FIG. 3 illustrates an AI system including a robot according to an embodiment of the present disclosure.

FIG. 3 illustrates an AI system including a robot according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or any type of 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

Figure 4:
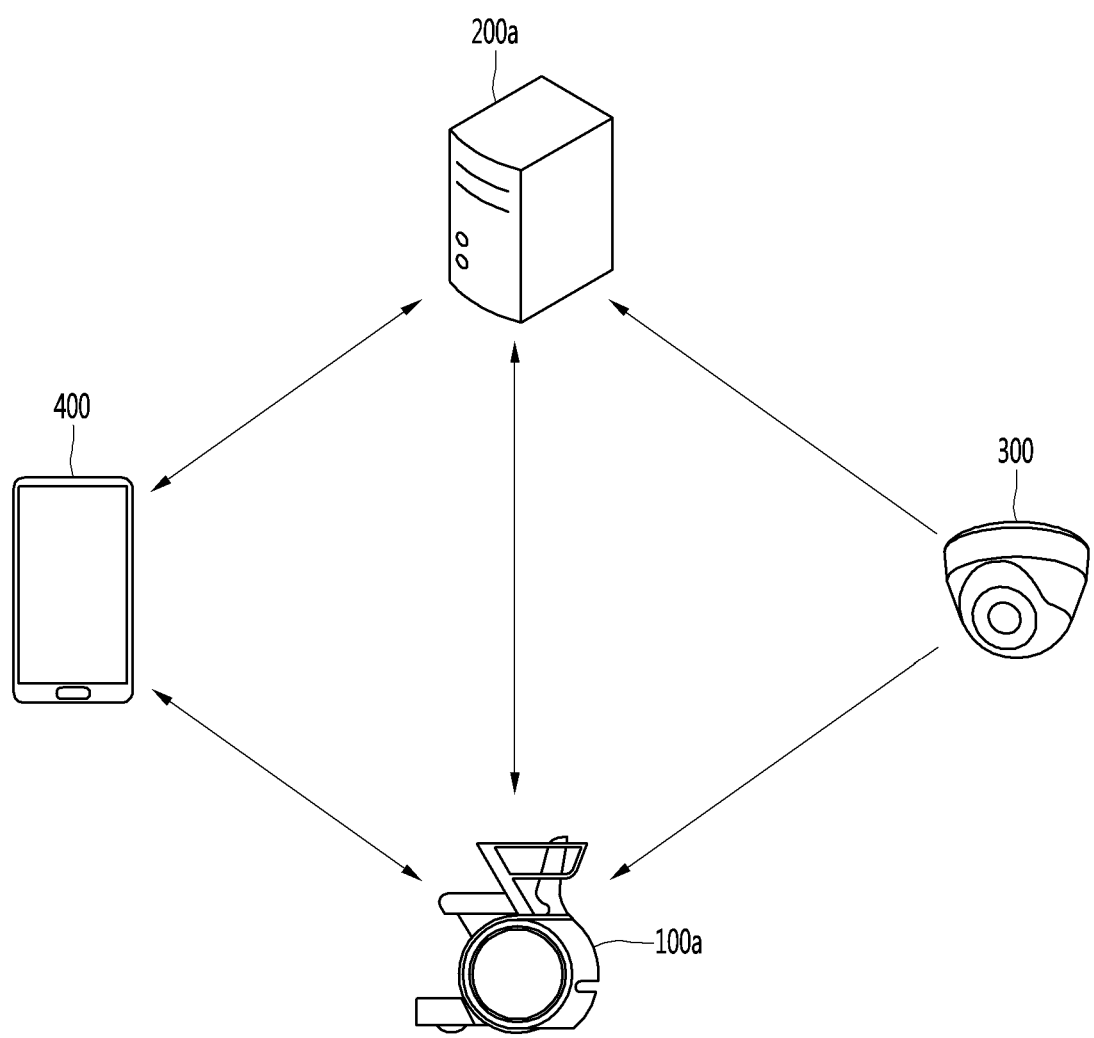
FIG. 4 is a system diagram showing a structure of a robot system according to an embodiment of the present disclosure.

FIG. 4 is a system diagram illustrating a structure of a robot system according to an embodiment of the present disclosure.

Referring to FIG. 4, a robot system may include a robot 100*a*, a server 200*a*, a camera 300, and a mobile terminal 400.

The robot 100*a* may perform various functions, such as patrolling, guiding, cleaning, carrying (i.e., carrying loads, medical equipment, etc.), quarantine, transportation, or any other function, in a space where the robot is disposed.

The robot 100*a* may transmit and receive a signal to and from the server 200*a* or the mobile terminal 400. For example, the robot 100*a* may transmit and receive a signal including situation information of the space to and from the server 200*a*. In addition, the robot 100*a* may receive image information obtained by photographing regions of the space from the camera 300.

Therefore, the robot 100*a* may monitor the situation of the space based on the image information photographed by the robot 100*a* and the image information received from the camera 300 in combination.

The robot 100*a* may receive a command directly from the user. For example, a command may be directly received from the user through an input generated by touching a display (e.g., a touch display) provided in (e.g., on) the robot 100*a* or a speech input to a microphone of the robot.

The robot 100*a* may perform an operation, such as patrolling, guiding, cleaning, or the like according to a command received from the user, the server 200*a*, or the mobile terminal 400.

Next, the server 200*a* may receive information from the robot 100*a*, the camera 300, and/or the mobile terminal 400. The server 200*a* may store and manage information received from each device in combination. The server 200*a* may transmit the stored information to the robot 100*a* or the mobile terminal 400. In addition, the server 200*a* may transmit a command signal for each of a plurality of robots 100*a* disposed in the space.

The camera 300 may include a camera installed in the space. For example, the camera 300 may include a plurality of CCTV (closed circuit television) cameras, infrared thermal cameras, or the like installed in the space. The camera 300 may transmit (e.g., wirelessly transmit) a photographed image to the server 200*a* or the robot 100*a*.

The mobile terminal 400 may transmit and receive data to and from the server 200*a*. For example, the mobile terminal 400 may receive a variety of data, such as data related to the characteristics of the spaces, map data of the spaces, and the like from the server 200*a*. For example, when the server 200*a* is a server related to an airport, the mobile terminal 400 may receive airport-related data such as a flight time schedule, an airport map, and the like from the server 200*a*.

The user may obtain and receive desired information from the server 200*a* through the mobile terminal 400. In addition, the mobile terminal 400 may transmit data such as a picture, a video, or a message to the server 200*a*. For example, the user may request cleaning of a corresponding region (e.g., user-selected region) by transmitting a picture of a lost child to the server 200a to register the lost child or taking a picture of a region requiring cleaning in the space with a camera and transmitting the picture to the server 200a.

In addition, the mobile terminal 400 may transmit and receive data to and from the robot 100a.

For example, the mobile terminal 400 may transmit a signal for calling the robot 100a, a command signal for directing execution of a specific operation, an information request signal, or the like to the robot 100a. The robot 100a may move to a position of the mobile terminal 400 in response to a call signal received from the mobile terminal 400 or execute an operation corresponding to the command signal. Alternatively, the robot 100a may transmit data corresponding to the information request signal to the mobile terminal 400 of each user.

Figure 5:
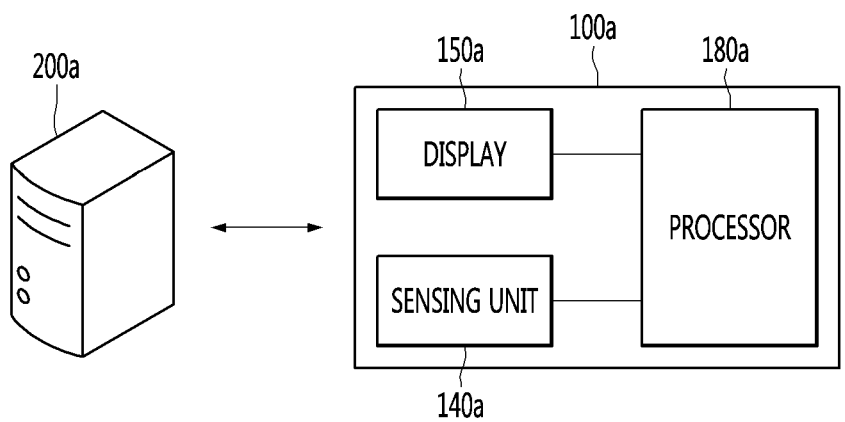
FIG. 5 illustrates a structure of a robot and a server interworking with the robot according to the present disclosure.

FIG. 5 illustrates a structure of the robot 100a of the present disclosure and the server 200a that interworks with the robot 100a.

Referring to FIG. 5, the robot 100a may interwork with the server 200a, and the robot 100a may include a sensing unit 140a, a processor 180a, and a display 150a. The mobile terminal 400 described above is considered as the same terms as the mobile 400.

In a boarding system of the robot 100a that moves a user to a destination using authentication information, the server 200a may transmit and receive the authentication information to and from the robot 100a, and the mobile terminal may be expressed as the mobile 400. The mobile terminal may include an application (referred to as an app) interworking with the server 200a to use the robot 100a, reserve the user's usage information through the app and call the robot 100a, which is waiting, through the app.

The robot 100a may store the authentication information, authenticates the user through the authentication information when being called by the mobile 400, and change its structure according to the body size of the user included in the usage information, and allow the user to be on board to move to the destination.

When the mobile 400 calls the robot 100a through the app, the server 200a may identify a position where the app is executed and transmit the position to the robot 100a. In this case, when the mobile 400 is connected to the server 200a, the mobile 400 may receive a request for input of the user's body size and convenience facilities to be used while moving to the destination.

When the user's request is received, the server 200a may receive a position of the user who executes the app from the mobile 400 by interworking with the app and transmit the execution position of the app to the robot 100a to allow the robot 100a to move to the position where the user exits.

When the robot 100a which is called is in front of the user, the user may determine whether the robot 100a is a robot reserved by the user, and tag the robot 100a through a previously-assigned bar code to enable the user to be authenticated as a user who is going to use the robot 100a.

The robot 100a may authenticate the user by comparing authentication information generated by using the personal information of the user with the authentication information of a bar code previously issued to the user, and when it is hard to authenticate the user (e.g., when user authentication fails), output a speech guidance to re-perform user authentication.

According to one embodiment, the authentication information may further include information on a destination arrival-requested time of the user. For example, the information on the destination arrival requested time may include a boarding time of transportation means, a start time of a schedule, and the like.

The sensing unit 140a may perform authentication for the user's boarding through the user's mobile 400, search for a position of the robot 100a, and may include at least one sensor for detecting a driving time and a driving speed for each section in the space.

For example, the sensing unit 140a may include an authentication interface and a position detector. In addition, the sensing unit 140a may have a built-in function, such as a timer and therefore, calculate the driving time of each section when entering each section.

For example, the authentication interface may authenticate the user through authentication information previously issued to the mobile 400 when the user reserves the use of the robot 100a. The server 200a may generate authentication information based on the personal information input by the user at the time of reservation by the user, and transmit authentication information or authentication means (e.g., a barcode) corresponding to the authentication information to the mobile 400 of the user or the like.

The authentication interface may authenticate the user through the authentication information, or the authentication means. The authentication information or the authentication means transmitted to the mobile 400 may be means for identifying a user capable of using the robot 100a when the robot 100a which is waiting is called. For example, when the authentication means corresponding to the authentication information is a barcode, the authentication interface may include a barcode recognizer (e.g., a barcode recognition sensor).

The robot 100a may recognize that the user who has made a reservation is a user who has a right to use the robot 100a through the authentication information.

The position detector may identify a position of the robot 100a. The position detector may include a light ranging and ranging sensor (lidar), a GPS receiver, or the like, and may recognize a current position through a driving map provided from the server 200a or the like.

The position detector may be installed at the rear, side, bottom, or the like of the robot 100a, and may include all means for determining where the robot 100a is currently located in the space.

The processor 180a may identify each time at which the robot 100a enters each section through the timer, and inform the user of a time elapsed in the corresponding section, and provide a notification about entrance into the next section.

The timer may obtain a destination arrival-requested time (e.g., a boarding time on vehicle means) through reverse calculation and the processor 180a may display a current remaining time on the display 150a according to a result of the reverse calculation.

The processor 180a may identify a position in the space by comparing a map with the position, provide a switching to an automatic mode or a manual mode, and control the driving the robot 100a (e.g., control the driving motor of the robot 100a) by selecting a plurality of driving modes with different driving speeds according to the sections.

The processor 180a may identify the current position through the position detector and to know in which section of the space the robot 100a is located by comparing the position with a map previously stored or provided in real time from the server 200a. The display 150a may display a request the user to switch to the automatic mode or the manual mode, if necessary, in the corresponding section.

The automatic mode is a setting for autonomous driving, and the manual mode is a setting for adjusting a speed through a speed controller disposed at a position that enable easy manipulation, such as an armrest, at a user's boarding position.

The speed controller may be configured in the form of a general joystick type button consisting of (+) and (−), or may be designed in a jog shuttle type to increase or decrease a speed in the right and left directions.

The processor 180a may propose a plurality of driving modes for the automatic mode according to sections. When the robot enters a corresponding section while driving in a general mode, the processor 180a may propose an additional driving mode through the display 150a, and when the user selects the additional driving mode, control the robot 100a so as to be driven in the corresponding driving mode. The driving mode will be described later in detail with reference to FIG. 6.

The display 150a may output and display a control state including a driving speed or a driving mode of the processor 180a and the sensing unit 140a, and provide an interface with the user to receive an input for switching to the automatic mode or the manual mode or selection of the driving mode.

The display 150a may display a screen within the user's gaze such that the user is able to identify a current position, a manual operation of the robot 100a, or a destination while driving, and may be designed to be rotatable at an angle for maintaining a gaze direction. The display 150a may display a driving time of each section and a remaining time until the destination arrival-requested time.

The display 150a may indicate in which section of the space the robot is located through comparison with the map and may propose an automatic mode required for a corresponding section to the user.

Accordingly, a boarding time to be described later may correspond to the time when the user should arrive at the destination, that is, the destination arrival-requested time.

Figure 6:
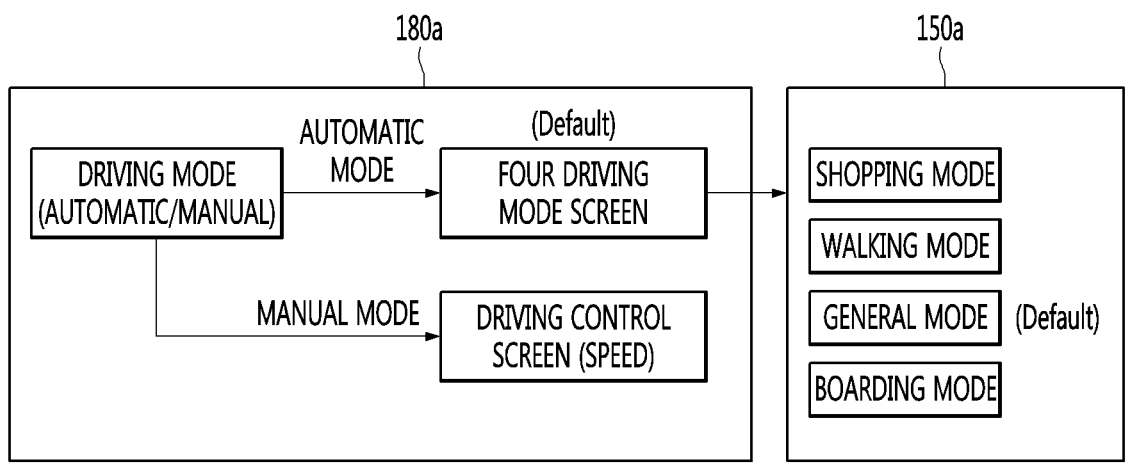
FIG. 6 illustrates a driving mode of a robot according to an embodiment of the present disclosure.

Referring to FIG. 6, the robot 100a may drive in the automatic mode and the manual mode, and when the robot 100a is switched to the manual mode by the user's selection, the robot 100a may be operated in the form of a joystick or a jog shuttle, and generally drive in the automatic mode. In addition, the automatic mode may be normally set to a general mode, and when the robot enters each section (within the space), a plurality of driving modes may be proposed according to the corresponding section. That is, the plurality of driving modes may be understood as a concept included in the automatic mode.

For example, the processor 180a may automatically set one driving mode based on the section and the authentication information. For example, the processor 180a may set the driving mode based on a destination arrival-requested time included in the authentication information, a distance between a current position and a destination, or an estimated time required to move from the current position to the destination.

In addition, the processor 180a may detect the position of the robot 100a through the position detector during driving of the robot 100a, and recognize that the robot 100a enters the next section according to a result of the detection. In this case, the processor 180a may maintain or change the driving mode based on the next section and the authentication information.

Alternatively, the processor 180a may propose a plurality of driving modes including a walking mode, a shopping mode, a boarding mode, and a general mode according to a section in the space, and control driving by varying a driving speed according to the user's selection.

Table 1 shows speeds, descriptions, and recognition methods for the plurality of driving modes.

TABLE 1

| AUTONOMOUS DRIVING MODE | AVERAGE SPEED | MINIMUM SPEED | MAXIMUM SPEED | DESCRIPTION | RECOGNIZING METHOD |
|---|---|---|---|---|---|
| SHOPPING MODE | 2 km/h | 1 km/h | 2.5 km/h | SUGGESTION SPEED AND ROUTE ACCORDING TO TAX FREE SHOPPING | AFTER COMPLETION OF IMMIGRATION INSPECTION AND ENTERING AIRSIDE, SUGGESTING SHOPPING MODE BASED ON POSITION AND BOARDING TIME |
| WALKING MODE | 3.5 km/h | 2 km/h | 4 km/h | MOVEMENT TO DESTINATION AT SPEED OF WALKING WITH COMPANION (NO RECOGNITION OF COMPANION AS OBSTACLE) | WHEN USER IS ON BOARD AFTER USER AUTHENTICATION, RECOGNIZING WHETHER COMPANION EXISTS OR SUGGESTING TO USER BEFORE DRIVING RECOGNIZING USING SMART KEY (APP) |
| GENERAL MODE | 3.8 km/h | 3 km/h | 4.5 km/h | (DEFAULT MODE) MOVEMENT TO DESTINATION(GATE) | USER BOARDS AND SETS WALKING MODE DRIVING IN GENERAL MODE IF USER DOES NOT SELECT ANOTHER DRIVING MODE SUGGESTED BASED ON LOCATION/TIME |
| BOARDING MODE | 5.5 km/h | 4 km/h | 6 km/h | FOR PRIORITY BOARDING OF WHEELCHAIR PASSENGERS, CALCULATING TIME AND AND POSITION TO NOTIFY | SUGGESTION AND GUIDANCE TO ARRIVE 10/15 MINUTES IN ADVANCE BASED ON BOARDING TIME AND LOCATION |

FIG. 6 illustrates a driving mode of the robot 100a according to an embodiment of the present disclosure.

Hereinafter, for convenience of description, it is assumed that a space where the robot 100a is disposed is an airport. However, embodiments to be described later are not applied only to the robot 100a disposed at the airport, but may be similarly applied to robots disposed in various spaces.

Referring to Table 1, the driving speeds in the shopping mode and the walking mode are slower than that in the general mode, and are faster than that in the boarding mode. The descriptions of sections for Table 1 will be described with reference to the control method of FIG. 9, and each speed mode will be described.

When the boarding of the user is authenticated, the processor 180a may automatically set the driving mode to the walking mode or propose the walking mode to the user through the display 150a when information on a companion of the user is input through an input interface, the display 150a or the like, and authentication information of the companion is obtained through the authentication interface.

The walking mode refers to a method of driving the robot 100a according to the walking speed of a companion when there is the companion. The user who boards the robot 100a may be an infant, an elderly person, or an uncomfortable pregnant woman or a disabled person. In this case, the driving of the robot 100a may be limited to the walking speed of a person, and set to be slower than an average walking speed, so that the robot 100a may be driven slowly with the companion.

The shopping mode is a section in which time is taken to look around goods, such as the duty free zone, and the processor 180a may propose the shopping mode when a predetermined time or more remains until the boarding time in a case where the user enters the air-side after the departure examination (e.g., after passing through security). That is, the shopping mode may be proposed by the processor 180a when at least a predetermined time remains until boarding time passing through security, in which the robot 100a is to be used for shopping and/or moving to different areas of the airport.

The boarding mode refers to a driving mode that may be rushing for boarding when less than a predetermined time remains until the boarding time or when another activity is not performed after passing through a boarding gate. Therefore, the speed may be set faster than the general mode, and an alarm may be provided in consideration of the driving time to a boarding gate.

The processor 180a may provide an alarm to the user at least once or more times when a time less than a preset time remains until the boarding time.

According to an embodiment of the present disclosure, the processor 180a may provide a first alarm 15 minutes before the boarding time, and provide a second alarm 10 minutes before the boarding time when the user has not yet boarded. A plurality of alarm settings is possible until the boarding time. That is, an alarm may be set by the processor 180a at any time, including any time before the boarding time.

Whether or not the boarding is completed is determined based on the time when the user has completed the use of the robot 100a. When an input on whether the use of the robot 100a has been completed is received from the user after arrival at a destination, notification may not be provided since it is determined that the boarding is completed.

In addition, the processor 180a may provide a plurality of activities which are executable in the section in consideration of the remaining time in the section, to the user through the display 150a.

When a time longer than a predetermined time is left (i.e., remains) until the boarding time, provision of the activity may provide convenience to the user by notifying the user of an activity and a required time in each section, such as a culture tour, duty-free shopping, and lounge break.

Hereinafter, a method of controlling the robot 100a which adjusts a speed of the robot 100a at the time of autonomous driving using the above-mentioned robot 100a will be described below.

Figure 7:
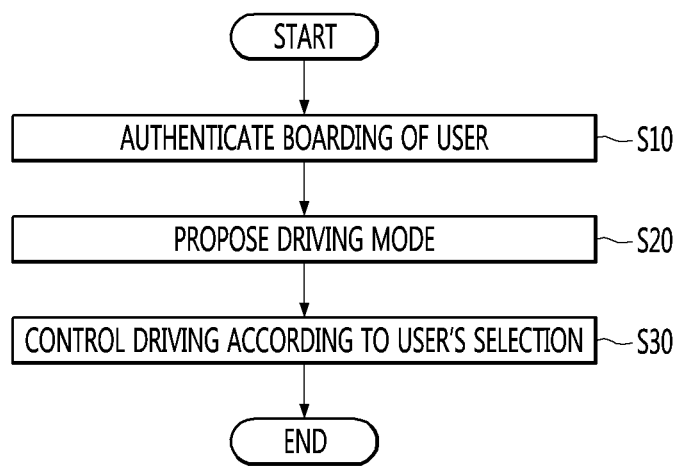
FIG. 7 illustrates a method for controlling a robot according to an embodiment of the present disclosure.

FIG. 7 is a flowchart of a method of controlling the robot 100a according to an embodiment of the present disclosure.

Referring to FIG. 7, the method of controlling the robot 100a may include: the step of authenticating a user's boarding (S10), proposing a driving mode (S20), and the step of controlling driving according to the user's selection (S30).

The step of authenticating the boarding of the user (S10) may be performed through the mobile terminal 400 of the user and is a process of performing authentication through a barcode issued at the time of reservation. In addition to barcodes, authentication may be performed using QR codes or passwords.

When the robot 100a which is called is in front of the user, the user may determine whether the robot 100a is a robot reserved by the user, and tag the robot 100a through a previously-assigned bar code to enable the user to be authenticated as a user who is going to use the robot 100a.

The authentication interface of the robot 100a may authenticate the user by comparing the authentication information generated using the personal information of the user with the authentication information of a barcode previously issued to the user, and when the authentication of the user is impossible, provide a speech guide to retry (i.e., reattempt) user authentication.

The authentication interface may store the authentication information, authenticate the user through the authentication information, allow the user to board the robot after authentication, and move to a desired boarding gate.

The step of proposing the driving mode (S20) is a process of identifying a section (e.g., area) in an airport according to a position and proposing at least one driving mode of a plurality of driving modes with different driving speeds for sections through the display 150a.

The processor 180a may propose a plurality of driving modes including a walking mode, a shopping mode, a boarding mode, and a general mode according to a section in the airport, and control driving by varying the driving speed according to the user's selection.

The step of controlling driving according to the user's selection (S30) is a process of proposing a driving mode capable of being operated in a corresponding section to the user.

Since the driving mode is usually set to the general mode, the driving mode may be operated in the general mode except when the user wants to drive in another mode, and the driving mode proposed may be operated when the proposed driving mode is selected.

Figure 8:
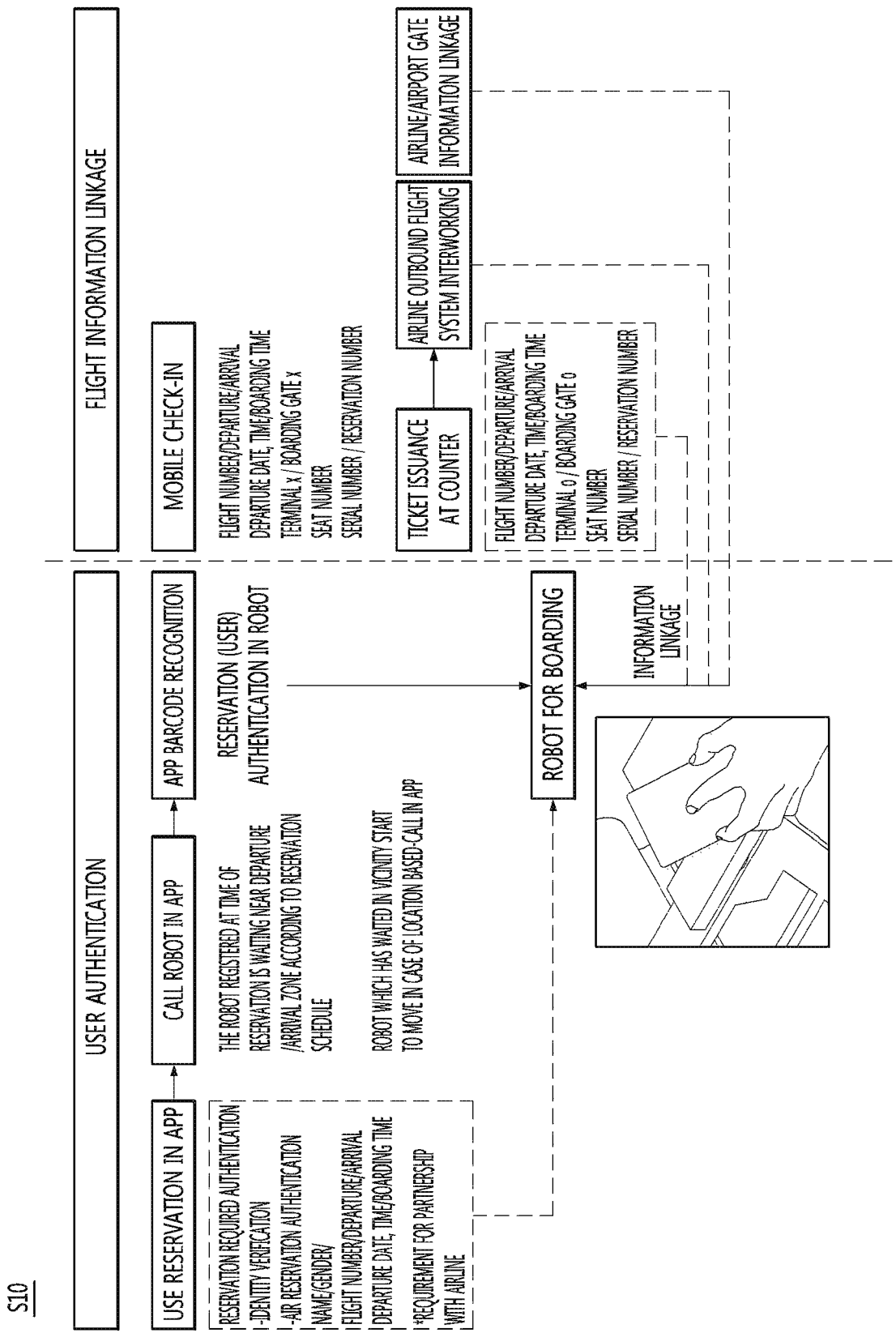
FIG. 8 illustrates a process of authenticating boarding of a user in a first stage according to an embodiment of the present disclosure.

FIG. 8 illustrates a process of authenticating boarding of a user in a first stage according to an embodiment of the present disclosure.

Referring to FIG. 8, a user may make a reservation for use using an app of the mobile terminal 400, call the robot 100a, and perform boarding after authentication through a previously issued barcode. The pre-stored reservation information of the user may be stored in the server 200a of the airline, and authentication may be performed through such an interworking process.

The authentication interface of the robot 100a may store the authentication information, authenticate the user through the authentication information, and the robot 100a may carry the user after authentication to move to a boarding gate desired by the user.

Since the authentication interface is provided with authentication information from the server 200a, autonomous driving to the destination is possible when the robot 100a is affiliated with the airline server 200a in advance so as to interwork with the airline server 200a, and reservation information such as a boarding gate through ticketing is provided from server 200a.

Figure 9:
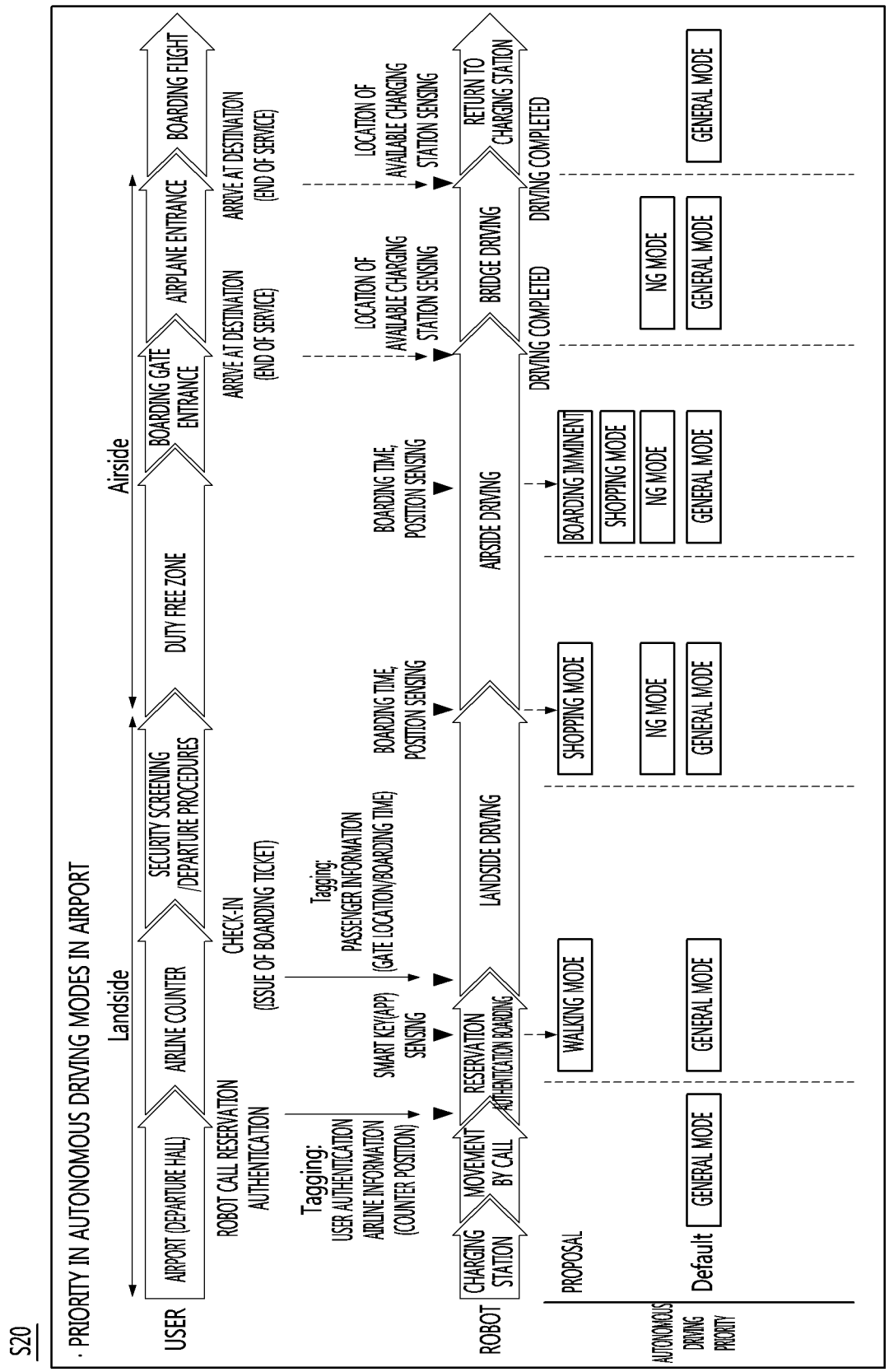
FIG. 9 illustrates priority in driving modes for sections according to an embodiment of the present disclosure.

FIG. 9 is a diagram illustrating a priority in driving modes for each zone in an airport according to an embodiment of the present disclosure.

Referring to FIG. 9, zones are provided starts with a departure hall, and according to an embodiment of the present disclosure, each driving mode is divided into an airline counter, security screening and departure procedure, duty-free zone, boarding gate entrance, boarding gate, or airplane entrance.

The aforementioned second stage may include detecting a position of the robot 100a, identifying a section in the airport according to the position, and searching for at least one driving mode among the walking mode, the shopping mode, the boarding mode, and the general mode according to the section.

The position detector may identify a position of the robot 100a. The location detector may include a lidar, a GPS, and the like, and may recognize a current position through a driving map provided from the server 200a.

In an airline counter, upon authentication of the robot 100a, boarding pass information or reservation information is automatically received from the server 200a, thereby searching for a ticketing position. The robot 100a may receive the information on the position of the counter and moves to the counter.

According to an embodiment of the present disclosure, a walking mode and a general mode may be provided. This will be described with reference to FIG. 10.

Figure 10:
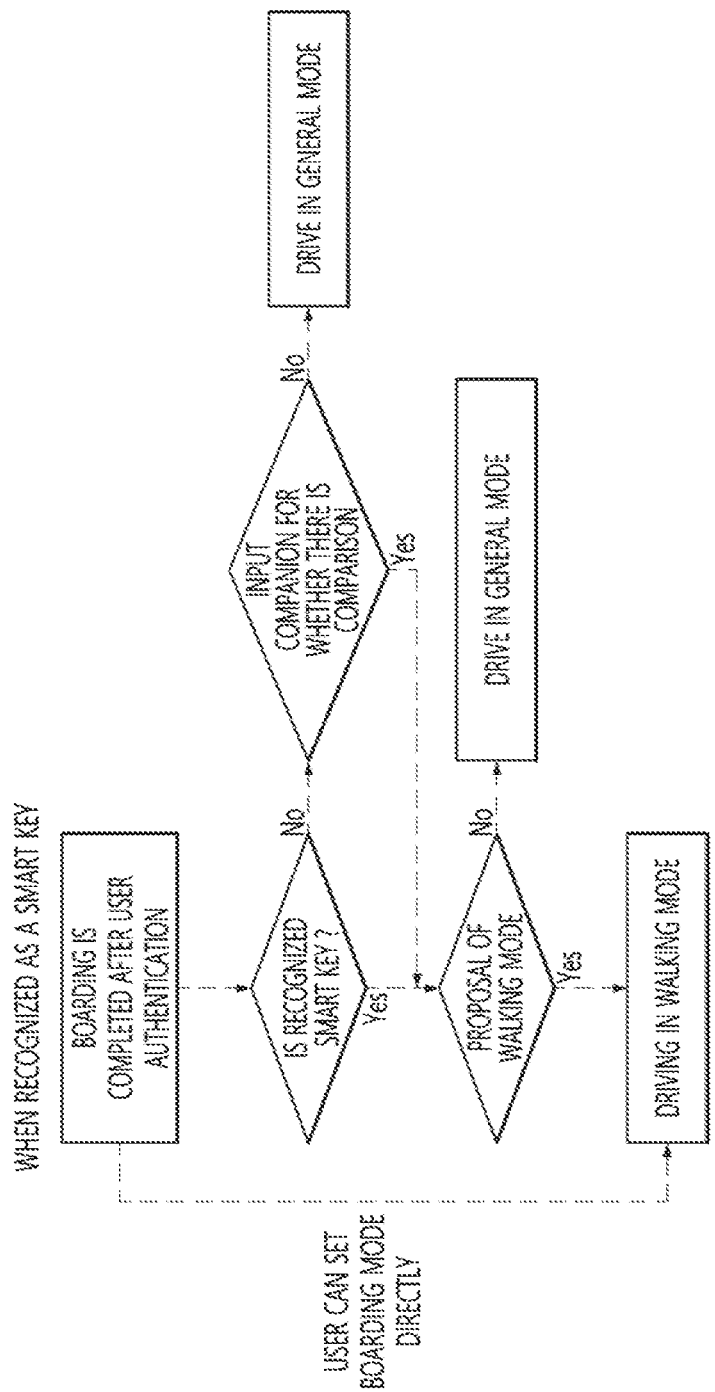
FIG. 10 illustrates a process of proposing a walking mode in a second stage according to an embodiment of the present disclosure.

FIG. 10 illustrates a process of proposing a walking mode in a second stage according to an embodiment of the present disclosure.

Referring to FIG. 10, after the user boards the robot 100a, the walking mode may be set or proposed when the authentication interface of the sensing unit obtains authentication information of another person (companion), or information on the companion is input through the input interface or the display from the user. For example, after authentication of the user, the processor 180a may set or propose the walking mode when authentication information is obtained from an authentication means (e.g., a smart key (app)) of another person (companion) near the robot 100a. Alternatively, the processor 180a may set or propose the walking mode when information of the companion is input through the input interface or the display after the user boards the robot 100a.

The walking mode refers to a method of controlling the driving speed of the robot 100a corresponding to a movement speed of a companion when there is the companion. The user who boards the robot 100a may be an infant, an elderly person, or an uncomfortable pregnant woman or a disabled person. In this case, the driving of the robot 100a may be limited to the walking speed of a person, and set to be slower than an average walking speed according to an embodiment, so that the robot 100a may be driven slowly with the companion.

In a zone for security screening and departure procedures, since the zone is located at the same location as the airline counter, but ticketing is completed, the robot 100a may be able to know (e.g., determine) a corresponding boarding gate and identify the map associated with the gate through the server 200a, thus driving in the walking mode or the general mode.

In the duty-free zone, since shopping is possible, the robot 100a may propose the shopping mode to the user. In this case, the processor 180a may detect a remaining time until the boarding time and a current position of the robot 100a and set or propose the shopping mode. This will be described with reference to FIG. 11

Figure 11:
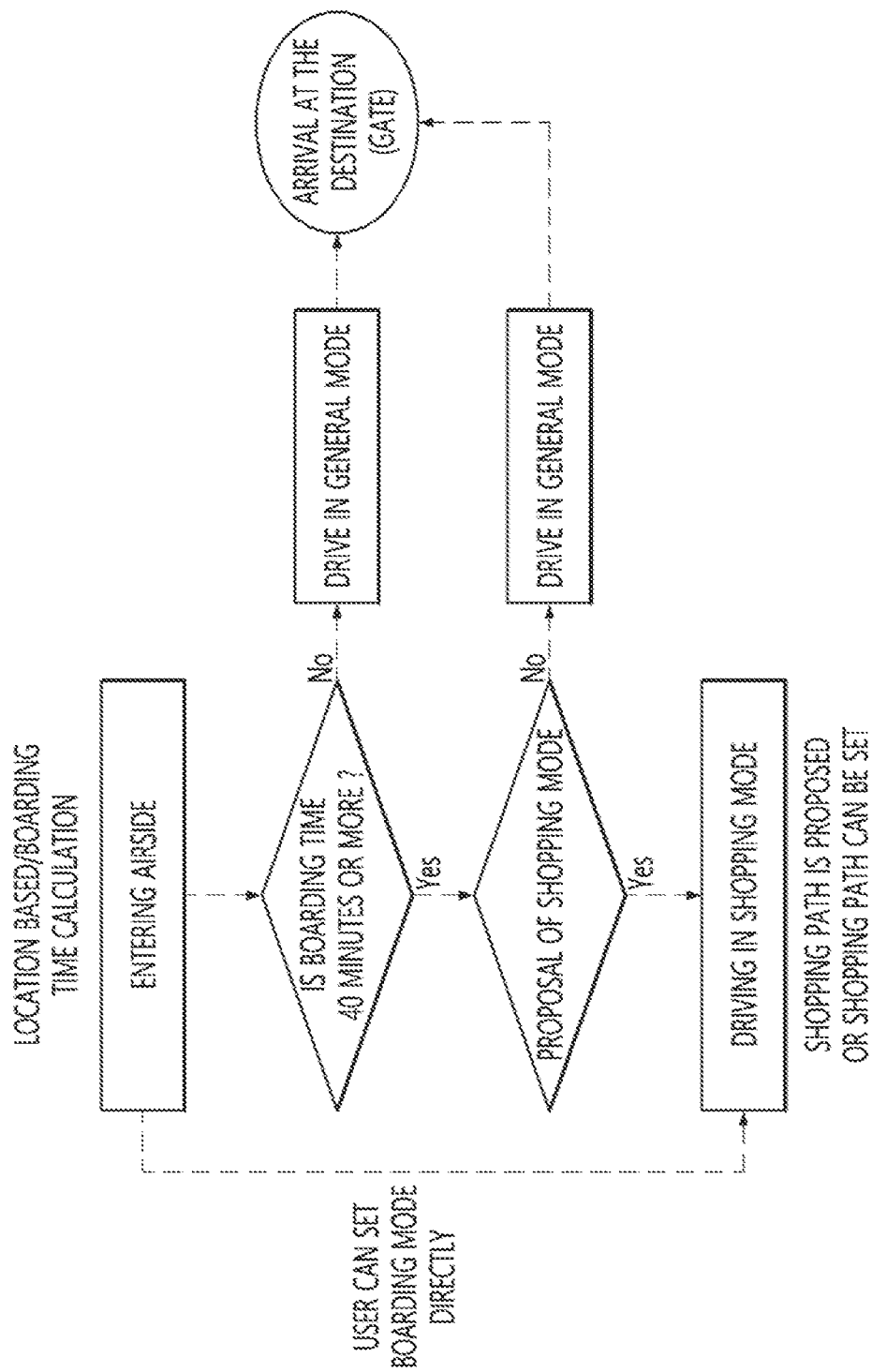
FIG. 11 illustrates a process of proposing a shopping mode in a second stage according to an embodiment of the present disclosure.

FIG. 11 illustrates a process of proposing a shopping mode in a second stage according to an embodiment of the present disclosure.

Referring to FIG. 11, when exiting an air-side entrance gate after completion of immigration inspection, the processor 180a of the robot 100a according to an embodiment of the present disclosure may set or propose the shopping mode based on a position of the air-side entry and the boarding time.

The process of setting or proposing the shopping mode may include: entering the air-side by the user and the robot 100a after the immigration inspection by the user; and determining whether a remaining time until the boarding time is greater than or equal to a preset time, and may be performed when the robot 100a is in the air-side and the remaining time is greater than or equal to the preset time.

For example, the processor 180a may automatically set or propose the shopping mode when the remaining time until the boarding time remains for 40 minutes or more. On the other hand, when the remaining time until the boarding time is less than 40 minutes, the processor 180a does not automatically set the shopping mode, but may propose the shopping mode such that the user can select the shopping mode. In the above process, when the shopping mode is selected by the user, the processor 180a may control the driving of the robot 100a to follow a predetermined shopping path or output an interface for setting a desired shopping path through the display and control the driving of the robot 100a to follow the shopping path set by the user.

For example, the processor 180a may automatically switch the driving mode to the boarding mode when the remaining time until the boarding time is less than a predetermined time, that is, when the boarding time is imminent, or may request the user to switch the driving mode to the boarding mode.

Figure 12:
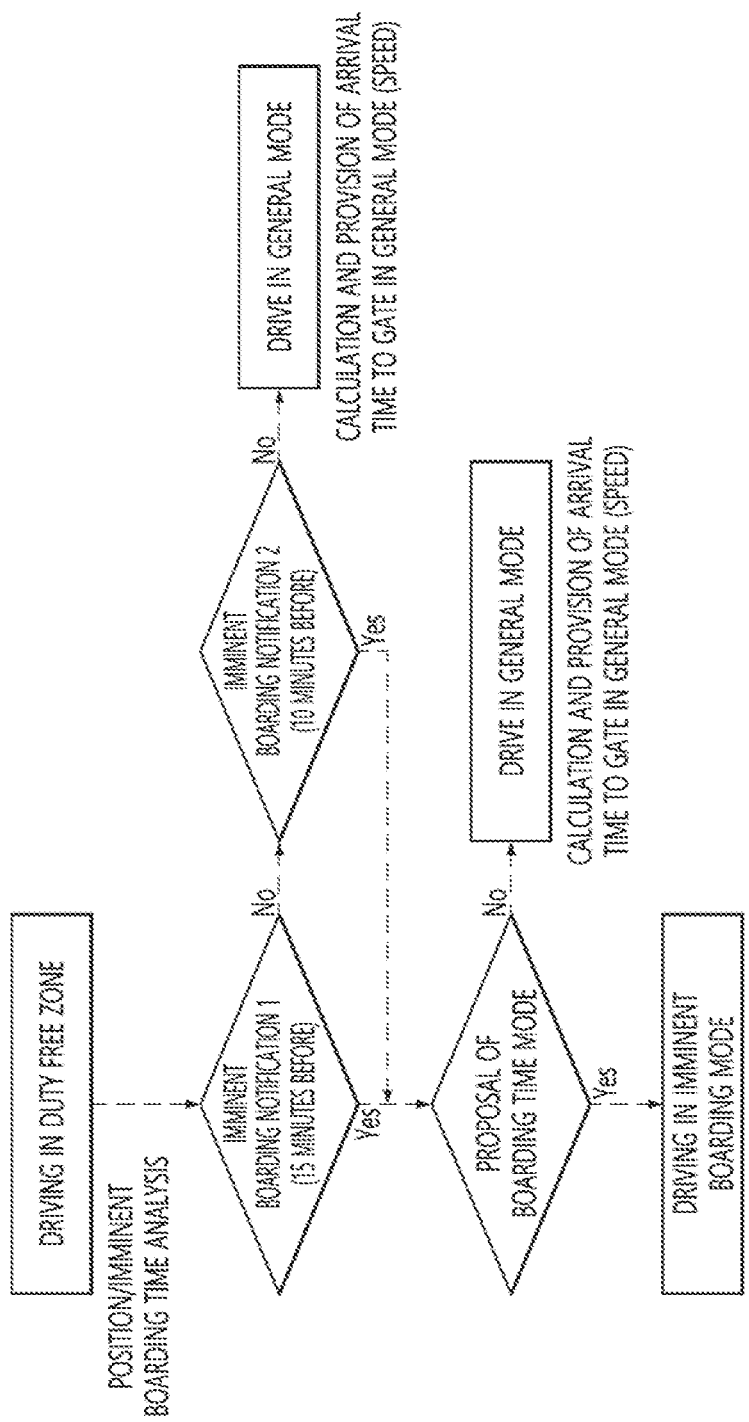
FIG. 12 illustrates a process of proposing a boarding mode in a second stage according to an embodiment of the present disclosure.

FIG. 12 illustrates a process of proposing a boarding mode of a second stage according to an embodiment of the present disclosure.

Referring to FIG. 12, a boarding mode in which a driving speed is faster than other driving modes may be proposed based on a position of a user and a remaining time until the boarding time.

The boarding mode may include determining whether the user enters a boarding area; and determining whether the remaining time until the boarding time is less than or equal to a preset time, and providing an alarm to the user at least once or more when the user is before boarding and the remaining time until the boarding time is less than or equal to the preset time.

The boarding mode may provide at least one notification to the user so as to arrive before a predetermined time (e.g., 10 minutes or 15 minutes) within a predetermined distance from the boarding position, or provide the notification to the user by adjusting the time and number of times to notify the user, based on the boarding time/position.

The boarding time may not be able to be arbitrarily adjusted by the user because boarding information is transmitted from the server to the robot 100a when a boarding pass is provided at an airline counter.

The processor 180a may automatically propose a boarding mode regardless of time to boarding, unlike a duty-free area at a gate entrance, and provide a user with a faster driving speed to induce boarding.

The processor 180a may control the driving speed of the robot 100a through a plurality of driving modes at the boarding gate or a plane entrance.

In addition, the use of the robot 100a by the user may be completed as the robot 100a enters a boarding gate area. In this case, since the robot 100a is able to move to a charging station in which the robot 100a may wait until use by the next user, the robot 100a may search for a nearby charging station.

The robot 100a may store and manage a map stored in the server 200a, a position at which the user boards the robot, and a position of a charging station for charging.

The server 200a may communicate with the robot 100a and provide a position of a user or a charging station within a short distance, and the robot 100a may determine a discharge of power supply and move itself to a nearby charging station for charging.

Figure 13:
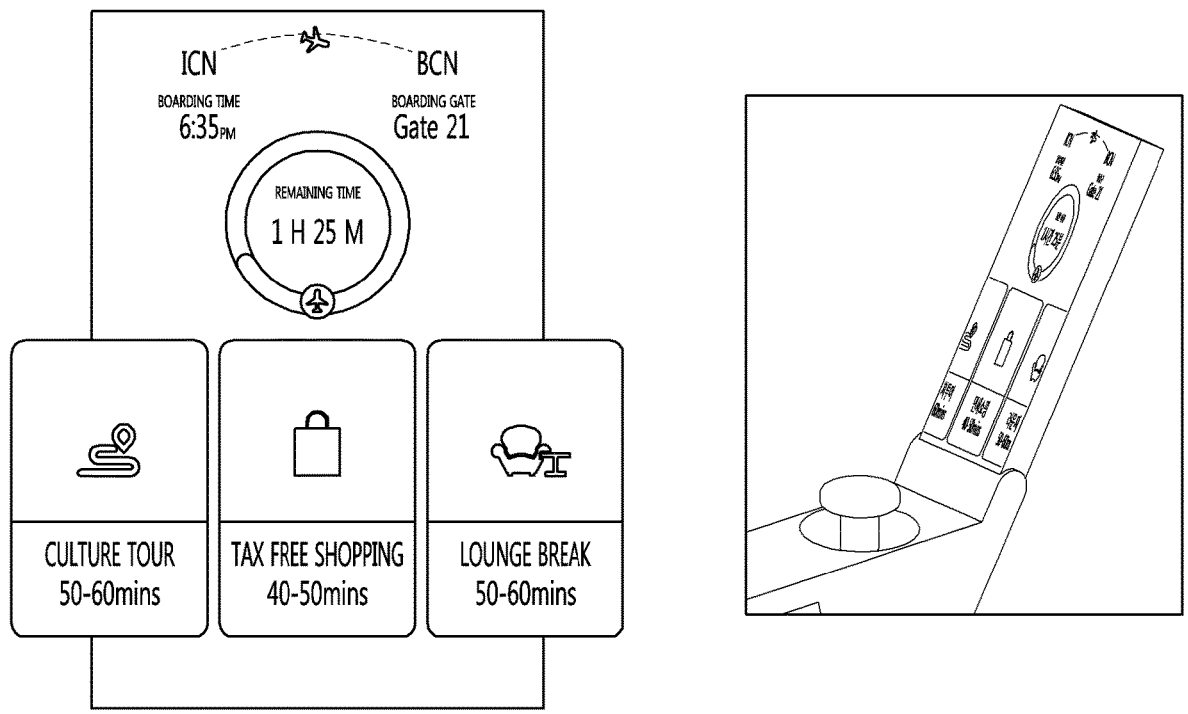
FIG. 13 illustrates various information on a display according to an embodiment of the present disclosure.

FIG. 13 is a diagram showing various information on a display according to an embodiment of the present disclosure.

Referring to FIG. 13, the display 150a may display a screen within the user's gaze such that the user is able to identify a current position, a manual operation of the robot 100a, or a destination while driving, and may be designed to be rotatable at an angle for maintaining a gaze direction. The display 150a may display a driving time of each section and a remaining time until boarding.

The display 150a may indicate in which section of the space the user (robot) is located through comparison with the map, and may propose an automatic mode required for a corresponding section to the user.

The processor 180a may provide a plurality of activities which are executable in the section to the user through the display 150a in consideration of the remaining time in the section. When the remaining time until the boarding time is greater than or equal to a preset time, an activity which is executable in each section, such as a culture tour, duty-free shopping, or lounge break and it's required time may be reported to the user, thus providing convenience to the user.

According to the present disclosure, it is possible to enable a person who uses the robot 100a for the first time to perform easy control and safe driving without learning or fear of operation, and guide the user through an optimized path when the user wants to move from the airport to the gate or go to the duty-free zone or food and beverage stores.

In addition, according to the present disclosure, it is possible to provide convenience by proposing a speed for each situation in the space and performing driving while providing the road guidance and achieving efficient use of time in the space by enabling shopping and movement freely and independently.

In addition, according to the present disclosure, the user can visually identify proposals according to each mode on the display, and can directly select the same, thus intuitively using the robot due to provision of visual and auditory guidance.

According to the present disclosure having the configuration as described above, there is an advantage that even a user who uses the robot for the first time can drive safely.

In addition, according to the present disclosure, it is possible to efficiently operate the time by proposing a variety of paths to the user and adjusting a speed in a corresponding area in a process of moving to the destination.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

The scope of the present disclosure should be construed on the basis of the accompanying claims, and all the technical ideas within the scope equivalent to the claims should be included in the scope of the present disclosure.

What is claimed is:

1. A robot, comprising:
   an authentication interface configured to authenticate a user boarding the robot using authentication information of the user;
   a position detector configured to detect a position of the robot in a space;
   a processor configured to:
      identify a first section corresponding to the detected position among a plurality of sections in the space,
      recognize at least one driving mode configurable for the first section among a plurality of driving modes having different driving speeds, wherein the plurality of driving modes include a shopping mode and a general mode,
      set the robot to a first driving mode among the recognized at least one driving mode for the first section based on at least one of the authentication information of the user, a destination arrival-requested time, the detected position or a destination, and
      control driving of the robot based on the first driving mode; and
   a display configured to output information regarding the set first driving mode,
   wherein the space includes an airport,
   wherein the processor is further configured to,
      detect that the robot and the user enter an air-side of the airport through the position detector, and
      set the first driving mode to the shopping mode when a remaining time until the destination arrival-requested time is greater than or equal to a preset time, and
   wherein a driving speed of the robot in the shopping mode is slower than a driving speed of the robot in the general mode.

2. The robot of claim 1, wherein the processor is further configured to:
   recognize that the robot is located in a second section among the plurality of sections, based on the position detected by the position detector during driving of the robot, the second section being adjacent to the first section, and
   maintain or change the set first driving mode based on the second section and the authentication information.

3. The robot of claim 1,
   wherein the destination arrival-requested time is included in the authentication information or is received from a server connected to the robot.

4. The robot of claim 3, wherein the processor is further configured to display, on the display, the remaining time until the destination arrival-requested time.

5. The robot of claim 1,
   wherein the plurality of driving modes further include a walking mode and a boarding mode, and wherein the general mode is a default driving mode of the robot.

6. The robot of claim 5, wherein the processor is further configured to set the first driving mode as the boarding mode when the remaining time until the destination arrival-requested time is less than the preset time, and
wherein a driving speed of the robot in the boarding mode is faster than the driving speed of the robot in the general mode.

7. The robot of claim 5, wherein the processor is further configured to set the first driving mode as the walking mode when information on a companion of the user is received or when authentication information of the companion is obtained through the authentication interface, and
wherein a driving speed of the robot in the walking mode is limited to a speed of the companion and is slower than the driving speed of the robot in the general mode.

8. The robot of claim 1, wherein the processor is further configured to, when the shopping mode is set, control driving of the robot to follow a preset shopping path or a shopping path set by the user.

9. The robot of claim 1, wherein the processor is further configured to switch the robot from the shopping mode to a boarding mode when the remaining time until the destination arrival-requested time is less than the preset time.

10. The robot of claim 3, wherein the processor is further configured to output information on at least one activity executable in the first section through the display when the remaining time until the destination arrival-requested time is greater than or equal to the preset time.

11. A robot, comprising:
an authentication interface configured to authenticate a user using authentication information of the user provided by a server, the authentication information of the user including a barcode, a QR code, a smart key or a password;
a position detector configured to detect a position of the robot in a space, the position being in a first section among a plurality of sections in the space;
a display; and
a processor configured to:
receive, via the server, destination information of the user, the destination information including a location of the destination and a destination arrival-requested time,
determine, based on the destination information of the user, at least one driving mode among a plurality of autonomous driving modes of the robot,
display, via the display, each of the at least one driving mode,
receive a user selection of a first driving mode among the at least one driving mode, and
control driving of the robot based on the selected first driving mode,
wherein the space includes an airport,
wherein the plurality of driving modes includes a shopping mode and a general mode, the general mode being a default driving mode of the robot,
wherein the processor is further configured to,
detect that the robot and the user enter an air-side of the airport through the position detector, and
set the first driving mode to the shopping mode when a remaining time until the destination arrival-requested time is greater than or equal to a preset time, and wherein a driving speed of the robot in the shopping mode is slower than a driving speed of the robot in the general mode,
when the first section is the air-side of the airport and the remaining time until the destination arrival-requested time is greater than or equal to the preset time, setting the first driving mode as the shopping mode for the first section, and
wherein the shopping mode includes controlling the driving of the robot so as to follow a preset shopping path or a shopping path set by the user based on the set shopping mode.

12. A method of controlling a robot, comprising:
authenticating, via an authentication interface of the robot, a user boarding the robot using authentication information of the user;
detecting, via a position detector of the robot, a position of the robot in a space;
identifying, via a processor of the robot, a first section corresponding to the detected position among a plurality of sections in the space;
setting, via the processor, a first driving mode, among a plurality of driving modes having different driving speeds, for the first section based on at least one of the authentication information, a destination arrival-requested time, the detected position or a destination; and
controlling, via the processor, driving of the robot based on the first driving mode,
wherein the space includes an airport,
wherein the plurality of driving modes includes a shopping mode and a general mode, the general mode being a default driving mode of the robot,
wherein the method further comprises, when the first section is an air-side of the airport and a remaining time until the destination arrival-requested time is greater than or equal to a preset time, setting the first driving mode as the shopping mode for the first section,
wherein a driving speed of the robot in the shopping mode is slower than a driving speed of the robot in the general mode, and
wherein the shopping mode includes controlling the driving of the robot so as to follow a preset shopping path or a shopping path set by the user based on the set shopping mode.

13. The method of claim 12, further comprising:
recognizing, via the processor, that the robot is located in a second section among the plurality of sections, based on a position detected during driving of the robot, the second section being adjacent to the first section; and
maintaining or changing the first driving mode based on the second section and the authentication information.

14. The method of claim 12,
wherein the destination arrival-requested time is included in the authentication information or is received from a server connected to the robot.

15. The method of claim 14, wherein the plurality of driving modes further includes a general mode, the general mode being a default driving mode of the robot, and
wherein the method further comprises, when a remaining time until to the destination arrival-requested time is less than a preset time, setting a driving speed of the robot in the first driving mode for the first section to be faster than a driving speed of the robot in the general mode.

16. The method of claim 14, wherein the general mode being a default driving mode of the robot, and wherein the method further comprises, when information on a companion of the user is received or when authentication information of the companion is obtained, setting a driving speed of the robot in the first driving mode for the first section to be slower than a driving speed of the robot in the general mode.

17. The method of claim 14, further comprising outputting, via a display of the robot, information on at least one activity executable in the first section when a remaining time until the destination arrival-requested time is greater than or equal to a preset time.

18. The method of claim 12, wherein the setting the first driving mode for the first section includes:
  outputting, via a display of the robot, information on at least one driving mode selectable based on the first section and the authentication information among the plurality of driving modes;
  receiving a selection input for the first driving mode among the output at least one driving mode; and
  setting the selected first driving mode for the first section based on the received selection input.

\* \* \* \* \*